United States Patent
Sachdeva et al.

(10) Patent No.: US 9,203,892 B2
(45) Date of Patent: Dec. 1, 2015

(54) CONTENT TRANSFER ACCELERATOR

(75) Inventors: Jasmeet Singh Sachdeva, New Delhi (IN); Shrikrishna Adhiraju, Andhra Pradesh (IN); Sachin Yambal, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 896 days.

(21) Appl. No.: 13/450,877

(22) Filed: Apr. 19, 2012

(65) Prior Publication Data

US 2012/0271880 A1    Oct. 25, 2012

(30) Foreign Application Priority Data

Apr. 19, 2011 (IN) .......................... 1340/CHE/2011

(51) Int. Cl.
*G06F 15/16* (2006.01)
*H04L 29/08* (2006.01)
*H04W 4/00* (2009.01)

(52) U.S. Cl.
CPC .............. *H04L 67/06* (2013.01); *H04W 4/003* (2013.01)

(58) Field of Classification Search
CPC ............................ H04L 67/06; H04W 4/003
USPC .................................. 709/203–204, 206, 246
See application file for complete search history.

(56) References Cited

U.S. PATENT DOCUMENTS

| 8,473,585 | B1 | 6/2013 | Smith et al. | |
|---|---|---|---|---|
| 2009/0077261 | A1* | 3/2009 | Broadhurst | 709/246 |
| 2010/0070595 | A1* | 3/2010 | Park et al. | 709/206 |
| 2014/0201615 | A1* | 7/2014 | Rajkumar et al. | 715/234 |

FOREIGN PATENT DOCUMENTS

CN       101656751       2/2010

OTHER PUBLICATIONS

'Multithreaded file copy: Support Forum: WinSCP,' [online]. "WinSCP Free SFTP, SCP and FTP client for Windows," 2006, [retrieved on Sep. 3, 2014]. Retrieved from the Internet: URL: http://winscp.net/forum/viewtopic.php?t=2768, 6 pages.

(Continued)

*Primary Examiner* — Minh-Chau Nguyen
(74) *Attorney, Agent, or Firm* — Fish & Richardson P.C.

(57) ABSTRACT

Content transfer technology, in which a client side component sends, to a server side component, a request for a content file from an enterprise content management system. The server side component establishes a connection with the enterprise content management system and downloads the content file. The client side component requests the server side component to transfer, to the client side component, the content file in configurable size chunks over multiple threads. The server side component reads, from the content file, chunks of content of the size specified by the client side component and transfers, to the client side component, the chunks of content over the number of the multiple threads specified by the client side component. The client side component receives, over the multiple threads, the chunks of content and, when all of the chunks of content have been received, recombines the chunks of content into the content file.

19 Claims, 14 Drawing Sheets

(56) References Cited

OTHER PUBLICATIONS

Scammell, "RichCopy: "Secret" Microsoft Multi-Threading Copy tool," Spiceworks, 2010, [retrieved on Sep. 3, 2014]. Retrieved from the Internet: URL: http://community.spiceworks.com/how_to/show/1351-richcopy-secret-microsoft-multi-threading-copy-tool, 4 pages.

'Wikipedia' [online] "BitTorrent" last modified Jul. 28, 2015, retrieved Aug. 7, 2015. Retrieved from https://en.wikipedia.org/wiki/BitTorrent, 20 pages.

* cited by examiner

| | | |
|---|---|---|
| User: | useradmin | 602 |
| Password: | ••••• | 604 |
| Database: | database1 | 606 |
| Database Path: | \databases\database1\database\fileA | 608 |
| Destination Directory: | \directory1 | 610 |
| Destination File: | file1 | 612 |
| Number of Threads: | 5 | 614 |
| Transfer Chunk Size: | 50MB | 616 |
| | Submit | 618 |

| 801a | File 1 Priority: | 2 | 816a |
| | User: | useradmin | 803a |
| | Password: | passwd | 804a |
| | Database: | database1 | 806a |
| | Database Path: | \databases\database1\database\fileA | 808a |
| | Destination Directory: | directory1 | 810a |
| | Destination File: | file1 | 812a |

| 801b | File 2 Priority: | 1 | 816b |
| | Use Same Login and DB Info: | ☑ 814b | |
| | Database Path: | \databases\database1\database\fileB | 808b |
| | Destination Directory: | directory1 | 810c |
| | Destination File: | file2 | 812c |

| 801c | File 3 Priority: | 3 | 816c |
| | Use Same Login and DB Info: | ☐ 814c | |
| | User: | adminuser | 803c |
| | Password: | ••••• | 804c |
| | Database: | database2 | 806c |
| | Database Path: | \databases\database2\database\fileC | 808c |
| | Destination Directory: | directory1 | 810c |
| | Destination File: | file3 | 812c |

Submit  802b        Add Another File  802a

FIG. 8

| | | 900 |
|---|---|---|
| 902 | User: | useradmin |
| | Password: | ••••• |
| | Database: | database1 |
| | Database Path: | \databases\database1\database\fileA |
| | Destination Directory: | directory |
| | Destination File: | file1 |
| | Number of Threads: | 5 |
| | Transfer Chunk Size: | 1000 |

Submit

Status: RUNNING  903a

Thread1  904

32%  908a

Thread2

26%  908b

Thread3

41%  908c

Thread4

22%  908d

Thread5

28%  908e

Pause 910     Stop 912

FIG. 9A

| | |
|---:|:---|
| User: | useradmin |
| Password: | ••••• |
| Database: | database1 |
| Database Path: | \databases\database1\database\fileA |
| Destination Directory: | directory |
| Destination File: | file1 |
| Number of Threads: | 5 |
| Transfer Chunk Size: | 1000 |

Submit

Status: PAUSED   *903b*

Thread1
▬▬▬▬▬▬▬▬  PAUSED   *922a*

Thread2
▬▬▬▬▬▬▬▬▬▬  PAUSED   *922b*

Thread3
▬▬▬▬▬▬▬▬▬▬▬▬  PAUSED   *922c*

Thread4
▬▬▬▬▬▬▬  PAUSED   *922d*

Thread5
▬▬▬▬▬▬▬▬▬  PAUSED   *922e*

Resume *924*     Stop

| User: | useradmin |
| ---: | :--- |
| Password: | ••••• |
| Database: | database1 |
| Database Path: | \databases\database1\database\fileA |
| Destination Directory: | directory1 |
| Destination File: | file1 |
| Number of Threads: | 5 |
| Transfer Chunk Size: | 1000 |

Submit

Status: COMPLETED  *903c*

Thread1
COMPLETED  *942a*

Thread2
COMPLETED  *942b*

Thread3
COMPLETED  *942c*

Thread4
COMPLETED  *942d*

Thread5
COMPLETED  *942e*

FIG. 9C

CONTENT TRANSFER ACCELERATOR

CROSS-REFERENCE TO RELATED APPLICATION

The present application claims the benefit of Indian Patent Application No. 1340/CHE/2011, filed on Apr. 19, 2011, which is incorporated herein by reference in its entirety for all purposes.

FIELD

This disclosure relates to content transfer technology and, for example, content transfer technology for enterprise content management systems.

BACKGROUND

A company may use an enterprise content management system to capture, manage, store, preserve, and deliver content and documents related to the company and its processes. The company may use various enterprise content management systems and may update or change enterprise content management systems as technology developments and new systems become available.

SUMMARY

In one aspect, a system includes a server side component that is configured to establish a connection with an enterprise content management system using a connector and that resides on an application server situated in a local area network with the enterprise content management system. The system also includes a client side component that is located remote from the server side component outside of the local area network and that is configured to communicate, over a wide area network, with the server side component to receive content managed by the enterprise content management system. The client side component is configured to send, to the server side component, a request for a content file from the enterprise content management system. The request includes an identifier for the content file and session information needed to establish a connection with the enterprise content management system. The server side component is configured to receive, from the client side component, the request for the content file, establish, using the connector and based on the session information, a connection with the enterprise content management system, and download, to the application server over the established connection, the content file based on the identifier for the content file. The client side component is configured to request the server side component to transfer, to the client side component, the content file in configurable size chunks over multiple threads. The client side component specifies a size of the chunks and a number of the multiple threads. The server side component is configured to read, from the content file downloaded to the application server, chunks of content of the size specified by the client side component and transfer, to the client side component, the chunks of content over the number of the multiple threads specified by the client side component. The client side component is configured to receive, from the server side component over the multiple threads, the chunks of content and, when all of the chunks of content have been received, recombine the chunks of content into the content file.

Implementations may include one or more of the following features. For example, the server side component may be configured to establish connections with multiple, different enterprise content management systems using multiple connectors. In this example, each of the multiple connectors may be configured to interface and enable connection with a particular enterprise content management system.

In some implementations, the multiple, different enterprise content management systems may include at least a first enterprise content management system with which the server side component establishes a connection using a first connector and a second enterprise content management system with which the server side component establishes a connection using a second connector. In these implementations, the client side component may be configured to send, to the server side component, a request for a first content file from the first enterprise content management system and a second content file from the second enterprise content management system. The request may include a first identifier for the first content file, a second identifier for the second content file, first session information needed to establish a connection with the first enterprise content management system, and second session information needed to establish a connection with the second enterprise content management system. In these implementations, the server side component may be configured to receive, from the client side component, the request for the first content file and the second content file, establish, using the first connector and based on the first session information, a first connection with the first enterprise content management system, download, to the application server over the first connection, the first content file based on the first identifier for the first content file, establish, using the second connector and based on the second session information, a second connection with the second enterprise content management system, and download, to the application server over the second connection, the second content file based on the second identifier for the second content file. The client side component may be configured to request the server side component to transfer, to the client side component, the first content file and the second content file in configurable size chunks over multiple threads. The client side component may specify a size of the chunks and a number of the multiple threads. The server side component may be configured to read, from the first content file and the second content file downloaded to the application server, chunks of content of the size specified by the client side component and transfer, to the client side component, the chunks of content over the number of the multiple threads specified by the client side component. The client side component may be configured to receive, from the server side component over the multiple threads, the chunks of content and recombine the chunks of content into the first content file and the second content file.

In some examples, the client side component may be configured to, based on user input, pause transfer of content in a subset of the multiple threads by sending, to the server side component, a request to stop transfer of additional chunks of content in the subset of the multiple threads, maintaining chunks of content received in the subset of the multiple threads prior to the user input to pause transfer of content, and storing tracking data that tracks progress of content transfer in the subset of the multiple threads and that enables content transfer in the subset of the multiple threads to resume at a point at which the transfer of content in the subset of the multiple threads was paused. In these examples, the client side component may be configured to, based on user input, resume transfer of content in the subset of the multiple threads by identifying additional chunks of content in the subset of the multiple threads that have not been received by the client side component based on the stored tracking data, sending, to the server side component, a request to resume transfer of the additional chunks of content in the subset of the multiple threads, receive, from the server side component over the subset of the multiple threads, the additional chunks of content, and recombine the maintained chunks of content and the additional chunks of content into the content file.

In some implementations, the client side component may be configured to, based on a single user input command to pause transfer of the content file, pause transfer of content in all of the multiple threads by sending, to the server side component, a request to stop transfer of additional chunks of content in all of the multiple threads, maintaining chunks of content received in all of the multiple threads prior to the user input to pause transfer of content, and storing tracking data that tracks progress of content transfer in all of the multiple threads and that enables content transfer in all of the multiple threads to resume at a point at which the transfer of content in all of the multiple threads was paused. In these implementations, the client side component may be configured to, based on a single user input command to resume transfer of the content file, resume transfer of content in all of the multiple threads by identifying additional chunks of content in all of the multiple threads that have not been received by the client side component based on the stored tracking data, sending, to the server side component, a request to resume transfer of the additional chunks of content in all of the multiple threads, receive, from the server side component over the multiple threads, the additional chunks of content, and recombine the maintained chunks of content and the additional chunks of content into the content file.

In addition, the client side component may be configured to send, to the server side component, a request for multiple content files and the server side component may be configured to receive, from the client side component, the request for the multiple content files and download, to the application server, the multiple content files. The client side component may be configured to request the server side component to transfer, to the client side component, the multiple content files in configurable size chunks over multiple threads. The client side component may specify a size of the chunks and a number of the multiple threads. The server side component may be configured to simultaneously transfer, to the client side component, the multiple content files by reading, from the multiple content files downloaded to the application server, chunks of content of the size specified by the client side component and transferring, to the client side component, the chunks of content over the number of the multiple threads specified by the client side component. The client side component may be configured to receive, from the server side component over the multiple threads, the chunks of content and recombine the chunks of content into the multiple content files.

Further, the client side component may be configured to assign, based on user input, priorities for transferring the multiple content files and control transfer of the multiple content files based on the assigned priorities. The client side component also may be configured to send, to the server side component, a request for multiple content files from multiple, different enterprise content management systems. The request may include an identifier for each of the multiple content files and session information needed to establish a connection with each of the multiple, different enterprise content management systems. The server side component may be configured to receive, from the client side component, the request for the multiple content files, establish, using multiple connectors and based on the session information, connections with each of the multiple, different enterprise content management systems, and download, to the application server over the established connections, the multiple content files based on the identifiers. Each of the multiple connectors may be configured to interface and enable connection with a particular enterprise content management system. The client side component may be configured to request the server side component to transfer, to the client side component, the multiple content files in configurable size chunks over multiple threads. The client side component may specify a size of the chunks and a number of the multiple threads. The server side component may be configured to simultaneously transfer, to the client side component, the multiple content files from the multiple, different enterprise content management systems by reading, from the multiple content files downloaded to the application server, chunks of content of the size specified by the client side component and transferring, to the client side component, the chunks of content over the number of the multiple threads specified by the client side component. The client side component may be configured to receive, from the server side component over the multiple threads, the chunks of content and recombine the chunks of content into the multiple content files.

In some examples, the client side component may be configured to determine current content transfer circumstances associated with transferring the content file to the client side component and automatically, without user input, determine content transfer parameters to use in transferring the content file to the client side component based on the current content transfer circumstances. In these examples, the client side component may be configured to determine a size of the content file and automatically, without user input, determine the content transfer parameters to use in transferring the content file to the client side component based on the size of the content file. Also, in these examples, the client side component may be configured to determine a current rate for transferring content to the client side component and automatically, without user input, determine the content transfer parameters to use in transferring the content file to the client side component based on the current rate for transferring content to the client side component.

The client side component may be configured to determine current content transfer circumstances associated with transferring the content file to the client side component and automatically, without user input, determine the size of the chunks to use in transferring the content file to the client side component based on the current content transfer circumstances. The client side component also may be configured to determine current content transfer circumstances associated with transferring the content file to the client side component and automatically, without user input, determine the number of the multiple threads to use in transferring the content file to the client side component based on the current content transfer circumstances. The client side component further may be configured to determine a size of the content file, determine a current rate for transferring content to the client side component, and automatically, without user input, determine the size of the chunks and the number of the multiple threads to use in transferring the content file to the client side component based on the size of the content file and the current rate for transferring content to the client side component.

In some implementations, the client side component may be configured to monitor for network fluctuation during transfer of the content file and automatically, without user input, handle network fluctuation in response to detection of network fluctuation during the monitoring. In these implementations, the client side component may be configured to automatically, without user input, restart transfer of the content file in response to detection of network fluctuation during the monitoring. Further, in these implementations, the client side component may be configured to automatically, without user input, modify content transfer parameters to use in transferring the content file to the client side component in response to detection of network fluctuation during the monitoring.

In another aspect, a computer-implemented method includes sending, from a client side component to a server side component, a request for a content file from an enterprise content management system. The server side component is configured to establish a connection with the enterprise content management system using a connector and resides on an application server situated in a local area network with the enterprise content management system. The client side component is located remote from the server side component outside of the local area network and is configured to communicate, over a wide area network, with the server side component to receive content managed by the enterprise content management system. The request includes an identifier for the content file and session information needed to establish a connection with the enterprise content management system. The method also includes receiving, by the server side component from the client side component, the request for the content file, establishing, by the server side component using the connector and based on the session information, a connection with the enterprise content management system, and downloading, by the server side component to the application server over the established connection, the content file based on the identifier for the content file. The method further includes requesting the server side component to transfer, to the client side component, the content file in configurable size chunks over multiple threads. The client side component specifies a size of the chunks and a number of the multiple threads. In addition, the method includes reading, by the server side component from the content file downloaded to the application server, chunks of content of the size specified by the client side component and transferring, by the server side component to the client side component, the chunks of content over the number of the multiple threads specified by the client side component. The method includes receiving, by the client side component from the server side component over the multiple threads, the chunks of content and, when all of the chunks of content have been received, recombining, by the client side component, the chunks of content into the content file.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIGS. 6, 8, and 9A-9C are diagrams illustrating exemplary user interfaces.

DETAILED DESCRIPTION

Techniques are described for accelerating content transfer in the enterprise content management space. As described throughout this disclosure, a content transfer accelerator may offer a multitude of features including content transfer acceleration, universal applicability, easy integration, pause/resume content transfer, multiple files, download priorities, and automatic handling of network fluctuation.

Figure 1:
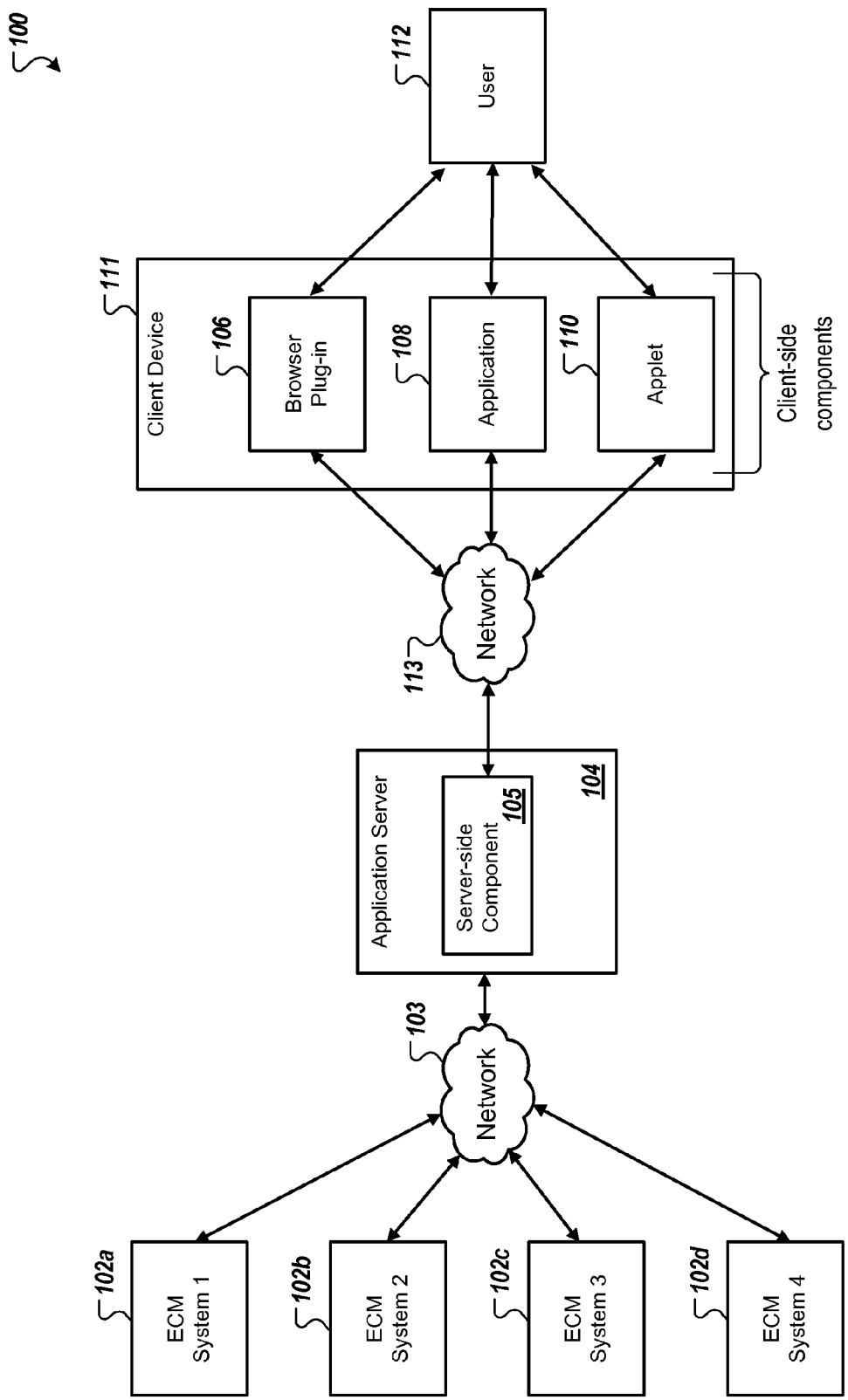
FIGS. 1, 2, 3, 4, and 12 are diagrams of exemplary systems.

FIG. 1 illustrates an exemplary system 100 for requesting content from an enterprise content management (ECM) system. The system 100 includes multiple ECM systems 102a, 102b, 102c, and 102d which are accessible over a network 103 from an application server 104. The network 103 may be, for example, a local area network (LAN) or some other type of network. Although FIG. 1 shows four ECM systems 102a, 102b, 102c, and 102d, this is exemplary only and other examples may include more or fewer ECM systems, including examples in which a single ECM system is used.

A server-side component 105 is deployed on the application server 104. One or more of a browser plug-in client-side component 106, an application client-side component 108, or an applet client-side component 110 running on a client device 111 may, for example on behalf of a user 112, send a request to the server-side component 105 for a content file from one or more of the ECM systems 102a, 102b, 102c, and 102d. The request may be sent, for example, over a network 113, where the network 113 may be, for example, a wide area network (WAN), the Internet, or some other type of network.

The server-side component 105 may connect to one or more of the ECM systems 102a, 102b, 102c, and 102d using one or more connectors and may download one or more requested content files to the application server 104. The one or more downloaded content files may be transferred to the client-side component which made the request (e.g., the browser plug-in client-side component 106, the application client-side component 108, or the applet client-side component 110). As described in more detail below, the one or more content files may be transferred in multiple chunks over multiple threads. In some implementations, the system 100 may be used to upload content to the ECM systems 102a, 102b, 102c, and 102d from the client device 111.

Figure 2:
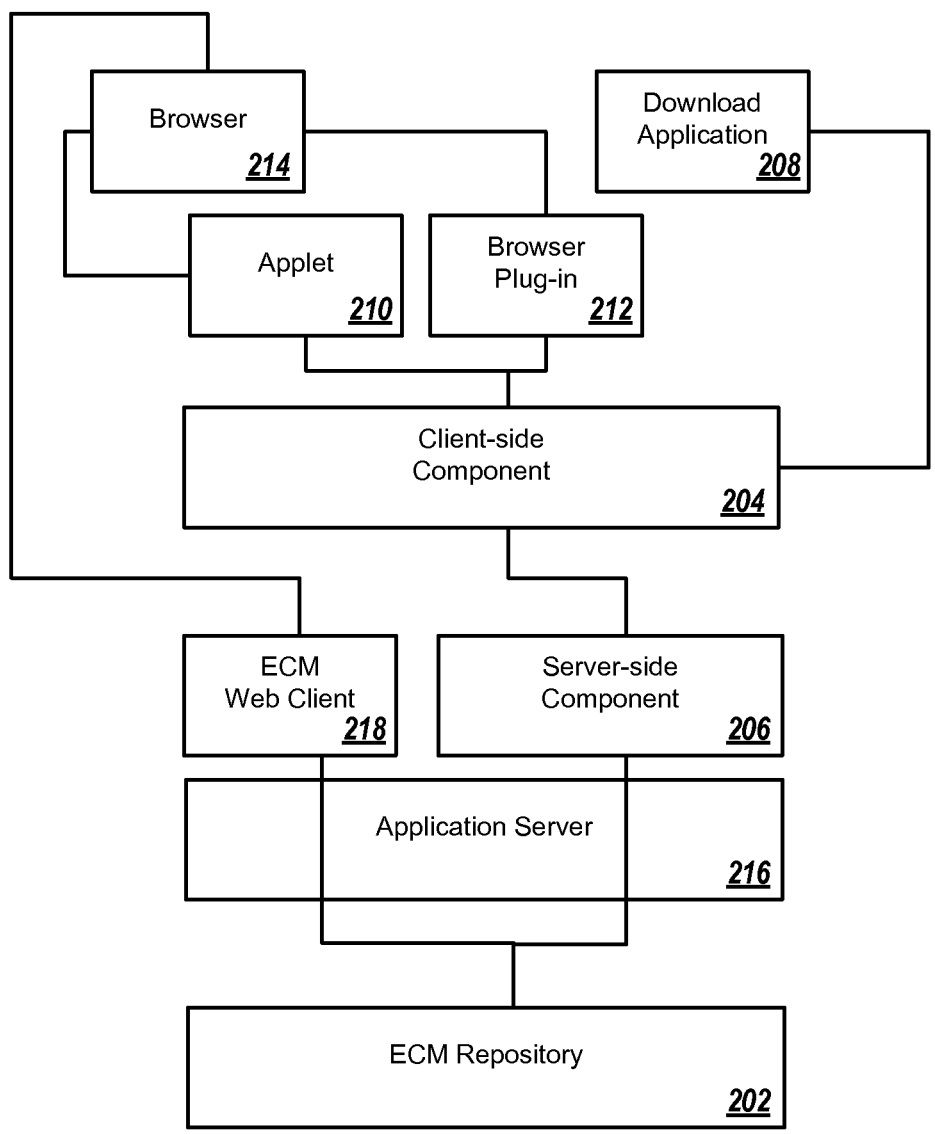

FIG. 2 illustrates an exemplary system 200 for downloading content from an ECM repository 202. The ECM repository 202 may be, for example, a repository associated with an ECM system which stores multiple content files. A user may use a client-side component 204 to request a server-side component 206 to download one or more content files from the ECM repository 202. The client-side component 204 may be implemented, for example, as a download application 208, or as an applet 210 or a browser plug-in 212 configured to execute in a browser 214. The download application 208 may be implemented, for example, using an API (Application Programming Interface). The applet 210 may be integrated, for example, with other user interface components in a web application configured to execute in the browser 214. Having multiple options for implementing the client-side component 204 can provide flexibility to application developers.

The server-side component 206 may reside on an application server 216 that is situated in a LAN with the ECM system that includes the ECM repository 202. Other components or applications may reside on the application server 216, such as an ECM web client 218. In some implementations, the applet 210 and/or the browser plug-in 212 is integrated with the ECM web client 218.

Figure 3:
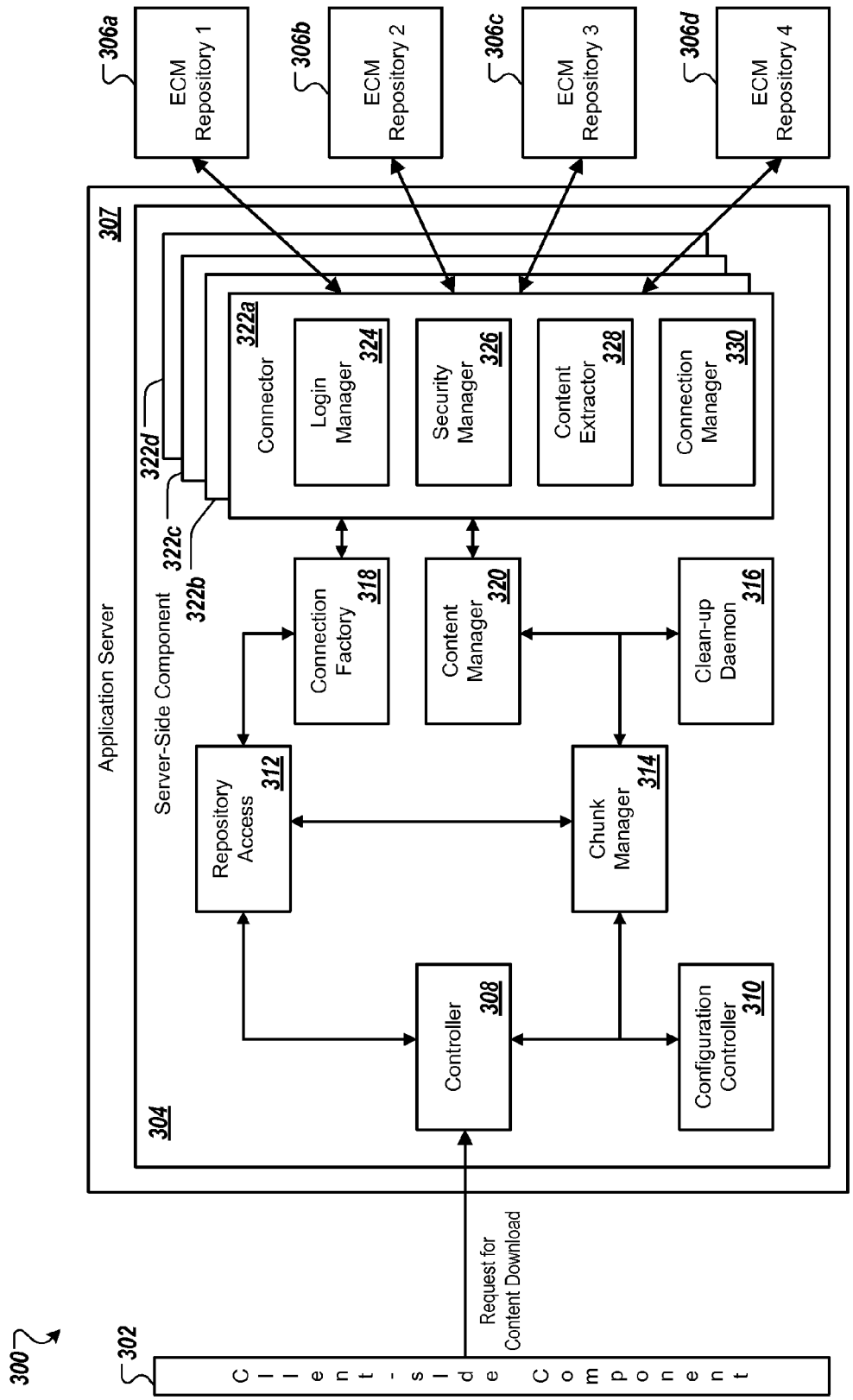

FIG. 3 illustrates an example system 300. The system 300 includes a client-side component 302, a server-side component 304, ECM repositories 306a, 306b, 306c, and 306d, and an application server 307. The client-side component 302 connects to the server-side component 304 and requests download of content from one or more of the ECM repositories 306a, 306b, 306c, and 306d. The server-side component 304 includes a controller 308, a configuration controller 310, a repository access channel 312, a chunk manager 314, a clean-up daemon 316, a connection factory 318, a content manager 320, and connectors 322a, 322b, 322c, and 322d.

Incoming requests from the client-side component 302 may be received by the controller 308. The controller 308 may route an incoming request to either the repository access channel 312 or to the chunk manager 314. The repository access channel 312 connects to one of the ECM repositories 306a, 306b, 306c, 306d, based on ECM session details included in the incoming request. The repository access channel 312 may download content temporarily to the application server 307 and may forward the received request to the chunk manager 314. As described in more detail below, based upon configuration settings, temporary content downloaded to the application server 307 may either be deleted immediately or deleted in a batch at a configurable time by the clean-up daemon 316. The chunk manager 314 is responsible for serving small chunks of files to the client-side component 302 in response to an incoming request received from the client-side component 302.

The connection factory 318 is responsible for identifying a particular ECM repository 306a, 306b, 306c, or 306d to connect to and for invoking the corresponding connector 322a, 322b, 322c, or 322d. Each connector 322a, 322b, 322c, and 322d is an implementation of an interface for connecting to a particular ECM repository 306a, 306b, 306c, or 306d. Each connector 322a, 322b, 322c, and 322d may be configured to handle, for example, connection parameters and authentication features specific to a particular ECM repository 306a, 306b, 306c, or 306d. Each connector 322a, 322b, 322c, and 322d is responsible for connecting to a particular ECM repository 306a, 306b, 306c, or 306d using session details included in an incoming request. Each connector 322a, 322b, 322c, and 322d may be used to download content to the application server 307. If a new ECM repository becomes available, a new connector may be created and may be configured to interface to the new ECM repository. Therefore, the server side component 304 may be configured to interact with various kinds of ECM systems, both known systems and systems that may become available on the market in the future.

Each connector 322a, 322b, 322c, and 322d includes a login manager, a security manager, a content extractor, and a connection manager (e.g., a login manager 324, a security manager 326, a content extractor 328, and a connection manager 330, respectively, included in the connector 322a). A login manager (e.g., the login manager 324) provides a generalized interface to receive authentication related information and may be configured to log into a particular ECM repository 306a, 306b, 306c, or 306d. A login manager may attempt to use an existing ECM session or the login manager may create a new ECM session using received credentials. For example, if the received credentials match credentials of an existing ECM session, the existing ECM session may be used rather than creating a new ECM session. A login manager may create an administrator session if the received request includes appropriate authentication information.

A security manager (e.g., the security manager 326) may perform additional validations, such as validations specific to particular requested content. A security manager may be used by developers to configure additional validations or rules for content access. A connection manager (e.g., the connection manager 328) manages the re-using of ECM sessions using session pooling if the corresponding ECM repository 306a, 306b, 306c, or 306d supports session pooling. A content extractor (e.g., the content extractor 328) extracts content from the corresponding ECM repository 306a, 306b, 306c, or 306d and sends extracted content to the content manager 320. To improve performance, a content extractor may request that the content manager 320 determine whether the content manager 320 already has the latest version of particular content. If the content manager 320 has the latest version of particular content, the content extractor may return a pointer to that content rather than download the content from the corresponding ECM repository 306a, 306b, 306c, or 306d.

The content manager 320 receives content from content extractors (e.g., content extractor 328) included in the connectors 322a, 332b, 332c, and 322d and maintains content transfer sessions as content is received. The content manager 320 may, based on configuration settings, delete a content file immediately after a download is completed. The content manager 320 may track when content is accessed.

The clean-up daemon 316 is a daemon thread which cleans up temporary files based on one or more rules. Rules may be specified, for example, in an XML (eXtensible Markup Language) file. An example rule may be based on a last-accessed time for content. For example, the clean-up daemon 316 may ask the content manager 320 to identify content which has not been accessed for a specified amount of time. The clean-up daemon 316 may then delete such content from the application server 307. In some implementations, custom rules may be defined (e.g., by a developer or an administrator) and may be used by the clean-up daemon 316.

The configuration controller 310 manages the loading and unloading of configuration files in the server side component 316. A configuration file may be, for example, a configuration file specific to the server-side component 316, a configuration file specific to the system 300, or a configuration file specific to a particular ECM repository 306a, 306b, 306c, or 306d. A configuration file may be in one of multiple formats. For example, a configuration file may be a properties file or may be an XML file. The configuration controller 310 may provide a single interface to manage the loading and unloading of configuration files, regardless of the type or format of the configuration files.

For XML configuration files, the configuration controller 310 may use the Xpath query language to locate a property in the configuration file and to return one or more values associated with the property. For properties that have multiple associated values, the multiple values may be returned in a data structure, such as an array or a list. The configuration controller 310 may provide a feature that allows one or more modifications to a configuration file to be loaded into memory without requiring a server restart. The configuration controller 310 may provide a feature that allows the reloading of a configuration file from disk storage. As another example, the configuration controller 310 may provide a feature that allows a configuration file to be automatically loaded or reloaded into memory after a configurable time interval has elapsed.

The client-side component 302 may send to the server-side component 304 a request for multiple content files. For example, the client-side component 302 may send a request for a first content file from the ECM repository 306a and for a second content file from the ECM repository 306c. The request may include, for example, a first identifier for the first content file, a second identifier for the second content file, first session information needed to establish a connection with the ECM repository 306a, and second session information needed to establish a connection with the ECM repository 306c.

The server-side component 304 may, in response to receiving the request for the first content file and the second content file, establish a first connection with the ECM repository 306a, for example, using the first session information and using a connector configured to interface with the ECM repository 306a (e.g., the connector 322a), and may establish a second connection with the ECM repository 306c, for example, using the second session information and using a connector configured to interface with the ECM repository 306c (e.g., the connector 322b).

Continuing the above example, the server-side component 304 may download, to the application server 307 over the first connection, the first content file based on the first identifier for the first content file and may download, to the application server 307 over the second connection, the second content file based on the second identifier for the second content file. The client-side component 302 may request the server-side component 304 to transfer, to the client-side component 302, the first content file and the second content file in configurable size chunks over multiple threads, where the size of the chunks and the number of threads may be specified by the client-side component 302.

The server-side component 304 may read, from the first content file and the second content file downloaded to the application server 307, chunks of content of the size specified by the client-side component 302. The server-side component 304 may transfer, to the client-side component, the read chunks of content over the number of the multiple threads specified by the client-side component 302. The server-side component may, for example, transfer chunks of the first content file simultaneously with the transfer of chunks of the second content file. As another example, the server-side component may transfer the chunks of the first content file and may transfer chunks of the second content file after the first content file has been transferred.

The client-side component 302 may receive the chunks of content for the first content file from the server-side component 304, over multiple threads, and may recombine the chunks of the first content file into the first content file. Similarly, the client-side component 302 may receive the chunks of content for the second content file from the server-side component 304, over multiple threads, and may recombine the chunks of the second content file into the second content file.

Figure 4:
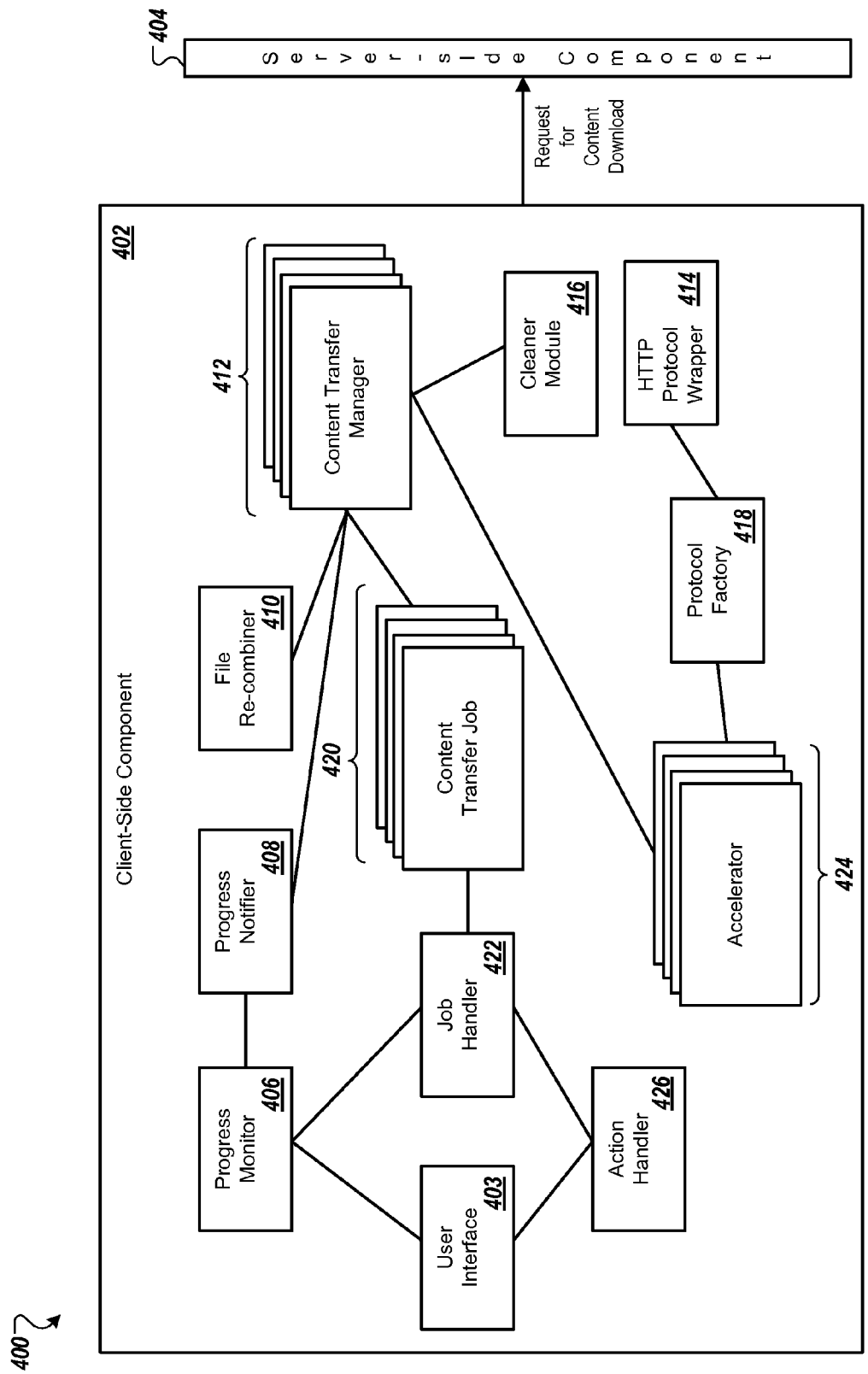

FIG. 4 illustrates an example system 400. The system 400 includes a client-side component 402 and a server-side component 404. The client-side component 402 may be, for example, the client-side component 302 of FIG. 3 and the server-side component 404 may be the server-side component 304 of FIG. 3. The client-side component 402 may send a request to download content from an ECM repository to the server-side component 404.

The client-side component 402 includes a user interface 403, a progress monitor 406, a progress notifier 408, a file re-combiner 410, one or more content transfer managers 412, an HTTP (HyperText Transfer Protocol) wrapper 414, a cleaner module 416, a protocol factory 418, one or more content transfer jobs 420, a job handler 422, one or more accelerators 424, and an action handler 426.

The user interface 403 may be used, for example, for testing and monitoring. The user interface 403 may display, for example, progress of current content downloads. The user interface 403 may be used, for example, to observe progress for purposes of comparing downloads downloaded using the server-side component 404 to downloads received from an ECM repository without using the server-side component 404.

The action handler 426 receives action requests, such as from the user. The action requests may include starting, stopping, pausing or resuming a download. The action handler 426 may invoke an appropriate action class to handle a received request and/or may pass a received request to the job handler 422. The job handler 422 manages one or more threads that are used for downloading content for a download request. A download request may be represented by a transfer content job 420.

The job handler 422 may create an associated content transfer manager 412 for each content transfer job 420. The action handler 426 may pass on requests such as for starting or stopping a content transfer job 420 to the job handler 422. The job handler 422 may, for example, set a flag for or otherwise notify a content transfer manager 412 associated with a content transfer job 420 if, for example, the content transfer job 420 needs to be paused or stopped. If a content transfer job 420 has been paused, the associated content transfer manager 412 may stop one or more threads that are associated with the content transfer job 420 and may wait for a "resume" signal from the job handler 422. If the job handler 422 notifies a content transfer manager 412 to stop an associated content transfer job 420, the content transfer manager 412 may stop one or more threads that are associated with the content transfer job 420 and may free one or more resources associated with the content transfer job 420.

The content transfer manager 412 for a content transfer job 420 may, at various times, start, stop, pause or resume a configurable number of threads for the content transfer job 420. The content transfer manager 412 for a particular content transfer job 420 may manage, for the content transfer job 420, the number of threads used, the distribution of file chunks for each thread, and the size of content pieces requested by each thread (e.g., as used in HTTP requests). Once all of the threads associated with a content transfer job 420 have confirmed that they have downloaded their assigned respective file chunks, the content transfer manager 412 associated with the content transfer job 420 may invoke the file re-combiner 410 to combine all of the received chunks into one file.

A thread may be represented by an accelerator 424. In general, an accelerator 424 is a thread which manages downloading file chunks assigned to the thread by the associated content transfer manager 412. An accelerator 424 repeatedly creates and sends HTTP requests to the server-side component 404 until the assigned file chunks have been downloaded. Each HTTP request may include, for example, ECM session information, an indication of a content file to download, a chunk size to be downloaded, and a byte range to be downloaded. The server-side component 404 may send, for example, a byte range of content downloaded in an HTTP response, and the accelerator 424 may compare the received byte range to the requested byte range, to determine whether the requested byte range was successfully downloaded.

Downloaded content may be added to a temporary file chunk and may be stored, when a complete file chunk has been received, for example, in electronic storage. To assure zero data loss while downloading content, an accelerator 424 may perform check-sum or other validation on downloaded bytes after each response is received and may also verify the size of the complete file chunk after the download of a particular file chunk has been completed. An accelerator 424 may notify the associated content transfer manager 412 when all assigned file chunks have been successfully downloaded.

To handle network fluctuations, an accelerator 424 may be configured to retry download requests multiple times up to a certain time limit or up to a certain number of download attempts. If a download has not successfully completed after a certain time limit or after a certain number of download attempts, the accelerator 424 may notify the associated content transfer manager 412. The associated content transfer manager 412 may propagate notifications to the job handler 422. Notifications may also be communicated to the user interface 403 (e.g., from the job handler 422).

As mentioned, the file re-combiner 410 combines downloaded file chunks associated with a content transfer job 420 when invoked by the corresponding content transfer manager 412. The order in which file chunks are combined may be specified, for example, by numeric values that are included at the end of downloaded file names. A numeric value may be added to a downloaded file name by an accelerator 424 when the accelerator 424 creates a file for an assigned file chunk.

An accelerator 424 may track progress of downloads assigned to the accelerator 424 and may inform the associated content transfer manager 412 after completion of each HTTP request and/or after completion of each file chunk. The associated content transfer manager 412 may, in turn, publish the status and progress of the accelerator 424 as well as an overall progress of the associated content transfer job 420 using the progress notifier 408. One or more components, such as the user interface 403, can register with the progress notifier 408 to receive status updates for one or more content transfer jobs 420.

The progress monitor 406 may provide an interface between the user interface 403 and the progress notifier 408. A default registration for the progress monitor 406 can include a registration to be notified for overall file progress and the progress of each accelerator 424 for a content transfer job 420. The progress monitor 406 can provide a feature that allows for custom monitors to be created and used in the client side component 402. The cleaner module 416 may free memory and other resources and may delete temporary files after a content transfer job 420 is completed. The cleaner module 416 may be notified of a download completion, for example, by the content transfer manager 412 associated with the content transfer job 420.

The client-side component 402 may use one or more of a number of different protocols to communicate with the server-side component 404. As discussed above, one such protocol may be HTTP. The HTTP protocol may be represented by the HTTP protocol wrapper 414. The HTTP protocol wrapper 414 may include, for example, configuration or other settings, such as proxy settings, that are specific to using HTTP in the system 400. The HTTP protocol wrapper may be created, for example, by the protocol factory 418. The protocol factory 418 may determine which protocol to use and may create a protocol wrapper appropriate for the determined protocol. Another protocol that may be used, for example, is FTP (File Transfer Protocol).

Figure 5:
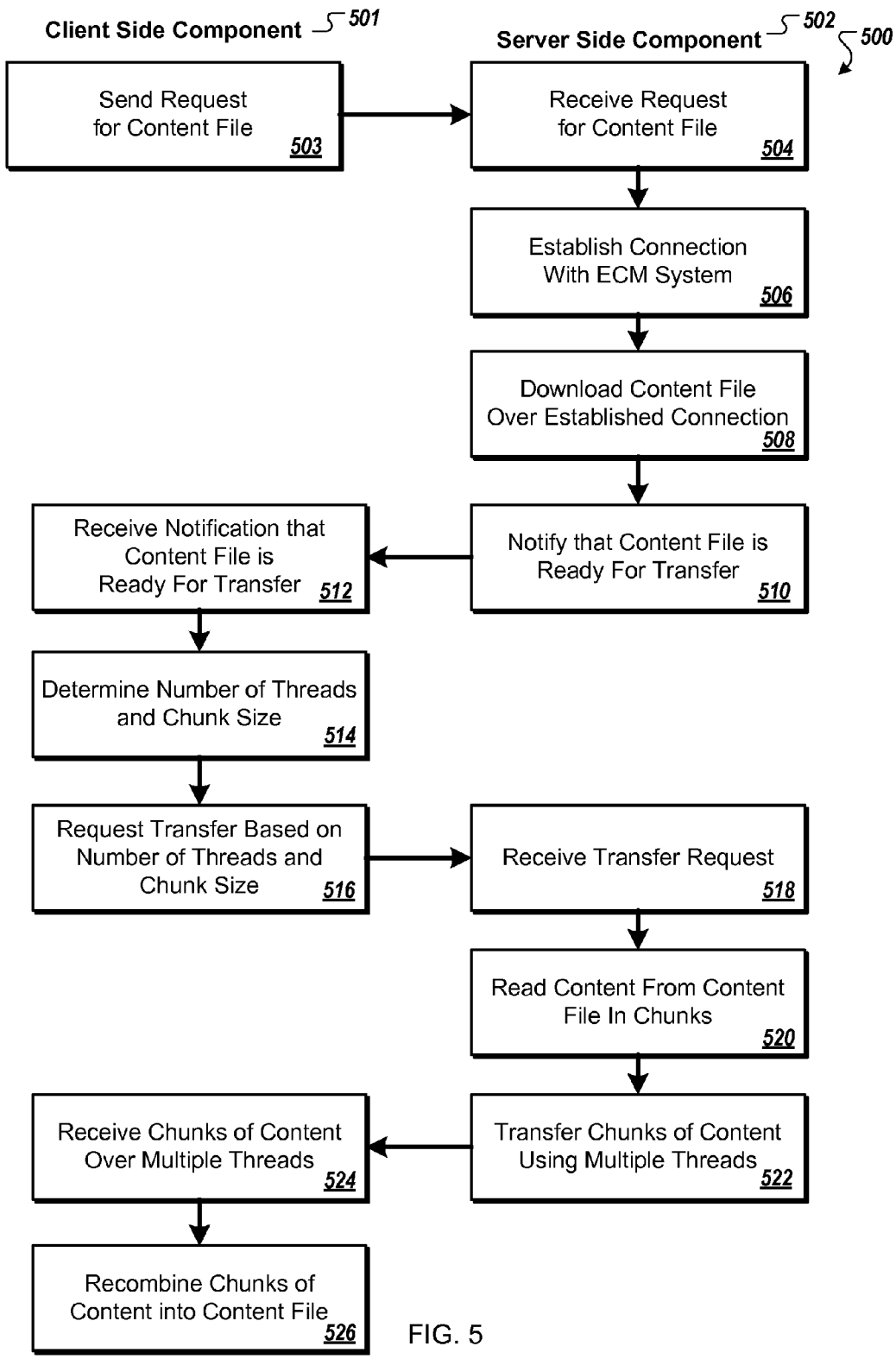
FIGS. 5, 7, and 10 are flowcharts of exemplary processes.

FIG. 5 illustrates a process 500 for transferring content. In some implementations, operations of the process 500 may be performed by one or more processors included in one or more electronic devices. A client-side component 501 sends, to a server-side component 502, a request for a content file from an enterprise content management system, where the request includes an identifier for the content file and session information needed to establish a connection with the enterprise content management system (503).

The server-side component 502 receives the request for the content file (504), and establishes, using a connector and based on the session information, a connection with the enterprise content management system (506). The server-side component 502 downloads the content file to an application server over the established connection, based on the identifier for the content file (508). The server-side component 502 sends a notification to the client-side component 501 that the content file is ready for transfer (510) and the client-side component 501 receives the notification (512).

The client-side component 501 determines a number of threads and a chunk size to use for transfer of the content file (514). The client-side component 501 requests the server-side component 502 to transfer the content file to the client-side component 501 in configurable size chunks over multiple threads, with the request specifying the determined chunk size and the determined number of threads (516). The server-side component 502 receives the request to transfer the content file (518). The server-side component 502 reads, from the content file downloaded to the application server, chunks of content of the size specified by the client side component 501 (520).

The server-side component 502 transfers the chunks of content to the client-side component 501 using the number of multiple threads specified by the client-side component 501 (522). The client-side component 501 receives the chunks of content from the server-side component 502 over the multiple threads (524). The client-side component 501 recombines the chunks of content into the content file when all of the chunks of content have been received (526).

FIG. 6 illustrates an exemplary user interface 600 for configuring a content download. The functionality of the user interface 600 may, for example, be integrated into a client-side component such as an application, an applet, or a browser plug-in. A user field 602 and a password field 604 may be used to specify authentication information for logging in to an ECM system. For example, the user has entered a user name of "useradmin" and has entered a password (shown as masked). A client-side component may include authentication information when sending a request for downloading of content to a server-side component (e.g., the server-side component 502 described above with respect to FIG. 5). The server-side component may use the authentication information when connecting to the ECM system.

A database field 606 and a database path field 608 may be used to specify a particular database to connect to and the location of the database, respectively, on the ECM system. For example, the user has entered a database name of "database1" and has entered a database path of "\databases\database1\database\fileA". The database path field 608 may also include the name of a content file to download (e.g., "fileA"). A destination directory field 610 and a destination file name field 612 may be used to specify a location and name of a target file name, respectively. For example, the user has entered a destination directory of "\directory1" and has entered a destination file name of "file1".

In some implementations, the user can specify a thread count to use for downloading the content file using a thread count field 614. As described above, a content file may be transferred using multiple threads. In some implementations, the thread count is determined automatically (e.g., by a client-side component or by a server-side component), while in some implementations, the thread count can be specified by the user using the thread count field 614. In some implementations, the system may consider the user-entered thread count value but may adjust the actual thread count based on current conditions. Validation may be performed on the value entered in the thread count field 614. For example, the thread count field may be validated to ensure that the thread count is a positive number less than or equal to a predetermined maximum threshold (e.g., seven). As another example, the thread count value may be validated to ensure that the thread count is within a predetermined range (e.g., three to ten).

A transfer chunk size field 616 may be used to specify the size of a content chunk to use when downloading content. For example, the user has entered a chunk size of fifty megabytes.

As described above, a content file may be downloaded in multiple chunks and the multiple chunks may be recombined after all chunks have been downloaded. One or more chunks of content may be assigned to each thread.

The user may select a submit control 618 to initiate a download. For example, in response to selection of the submit control 618, the process 500 described above with respect to FIG. 5 may be performed. As another example, the information in the fields 602-616 may be sent in a request to a server-side component, a connection may be made to the ECM system, multiple threads corresponding to the thread count field 614 may be created, and each thread may send requests for download of one or more chunks of content corresponding to the transfer chunk size field 616.

Figure 7:
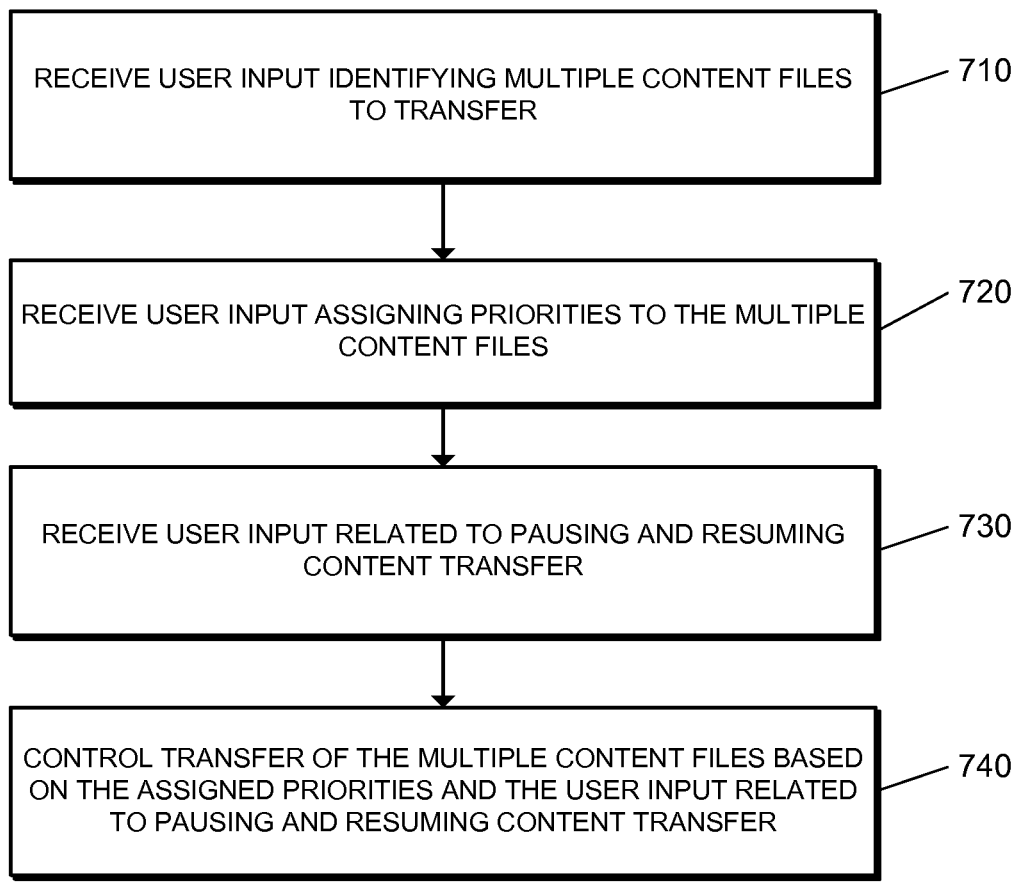

FIG. 7 illustrates a process 700 for transferring content. The operations of the process 700 are described generally as being performed by the system 100. In some implementations, operations of the process 700 may be performed by one or more processors included in one or more electronic devices.

The system 100 receives user input identifying multiple content files to transfer (710). For example, information identifying multiple content files to transfer may be received as user input from a user interface of a client-side component which may be, for example, an application, an applet, or a browser plug-in. For example, FIG. 8 illustrates an exemplary user interface 800. The user interface 800 includes multiple file information areas 801a, 801b, and 801c, for specifying information for a first, second, and third content file to transfer, respectively. A control 802a may be selected to add an additional file information area for an additional file to transfer. Information may be submitted using a control 802b.

The file information areas 801a, 801b, and 801c may each include one or more controls that are similar to one or more controls included in the user interface 600 described above with respect to FIG. 6. For example, the file information area 801a includes a user field 803a, a password field 804a, a database field 806a, a database path field 808a, a destination directory field 810a, and a destination file field 812a that are similar to the user field 602, the password field 604, the database field 606, the database path field 608, the destination directory field 610, and the destination file name field 612, respectively.

When specifying information for multiple files to transfer, the user may select a control 814b or a control 814c if login and database information for a respective content file is the same as login and database information for the first content file. For example, the user has selected the control 814b indicating that the same login and database information used for the first content file is also applicable to the second content file. That is, the information entered into the user field 803a, the password field 804a, the database field 806a, and the database path field 808a is applicable to both the first content file and the second content file. Upon selection of the control 814b (e.g., a "checking" of the control 814b), one or more controls relating to login and database information may be removed from the file information area 801b and upon a subsequent selection of the control 814b (e.g., an "unchecking" of the control 814b), one or more controls relating to login and database information may be shown in the file information area 801b. The file information area 801b includes a database path field 808b, a destination directory 810c, and a destination file directory 812c to indicate a source content file and a target file location and name, respectively, for the second content file.

As another example, the user has not selected the control 814c, indicating that login and database information different than that entered for the first content file may be entered for the third content file. For example, the user has entered user name, password, and database information for the third content file into fields 803c, 804c, and 806c, respectively. The user has also entered database path, destination directory, and destination file name information for the third content file into fields 808c, 810c, and 812c, respectively.

Returning to FIG. 7, the system 100 receives user input assigning priorities to the multiple content files (720). For example and as shown in FIG. 8, each of the file information areas 801a, 801b, and 801c include a respective priority field 816a, 816b, and 816c which the user may use to assign a priority to the respective content file. For example, the user has assigned a priority of one to the second content file, a priority of two to the first content file, and a priority of three to the third content file. In some implementations, some or all of the priority fields 816a, 816b, and 816c may be left empty indicating that priority is unassigned by the user to one or more respective content files. In some implementations, the user interface 800 enforces the priority fields 816a, 816b, and 816c to each have a unique priority value. In some implementations, the user interface 800 allows two or more of the priority fields 816a, 816b, and 816c to have the same priority value.

Returning to FIG. 7, the system 100 receives user input related to pausing and resuming content transfer (730). For example, user input related to pausing transfer of one or more content files may be received. As another example, user input relating to pausing one or more threads associated with the transfer of one or more content files may be received. For instance, FIG. 9A illustrates an example user interface 900. The user interface 900 includes a file information area 902 which includes information and controls similar to that of the user interface 600 described above with reference to FIG. 6. As another example, in some implementations, the file information area 902 may include information and controls relating to multiple content files, such as described above with respect to FIG. 8. The file information area 902 includes a status indicator 903a which indicates a current status of the transfer of the content file. For example, a current status of "RUNNING" is displayed in the status indicator 903a.

The user interface 900 includes a progress area 904. The progress area 904 includes thread progress indicators 908a-908e associated with five threads that are used to transfer the content file associated with the file information area 902. In some implementations, the progress area 904 includes an overall progress indicator (not shown in FIG. 9) showing overall transfer progress of the content file in addition to or in place of the thread progress indicators 908a-908e. In some implementations, the progress area 904 includes information relating to transfer of multiple content files. For example, the progress area 904 may include a progress indicator for each thread of multiple content files and/or the progress area 904 may include an overall progress indicator for each content file.

The user may select a pause control 910 to pause the five threads associated with transfer of the content file associated with the file information area 902. As described in more detail below, a paused transfer may be resumed. The user may select a stop control 912 to stop content transfer. In implementations where the user interface 900 shows information relating to multiple content file transfers, the user may, using the interface 900, pause or stop some or all content file transfers.

As shown in an example user interface 920 illustrated in FIG. 9B, a status indicator 903b may display "PAUSED" in response to a user pausing a content file transfer. Thread progress indicators 922a-922e may also indicate that respective threads have been paused. The user may resume content file transfer by selecting a resume control 924.

Returning to FIG. 7, the system 100 controls transfer of the multiple content files based on the assigned priorities and the user input related to pausing and resuming content transfer (740). In some implementations, resources may be allocated to content file transfers based on assigned priorities. For example, a higher priority content file transfer may be assigned more threads than a lower priority content file transfer. As another example a priority setting of one or more threads assigned to a higher priority content file transfer may be set to a higher priority value than a priority setting of one or more threads assigned to a lower priority content file transfer.

If a content file transfer is paused, a notification may be sent to one or more threads assigned to the content file transfer. One or more resources assigned to the content file transfer may be allocated to other, currently running content file transfers. If a content file transfer is resumed, a notification may be sent to one or more threads assigned to the paused content file transfer. As another example, one or more new threads may be created to handle the resuming of the content file transfer. If a content file transfer is stopped, a message may be sent to each thread associated with the content file transfer, notifying the respective thread to stop.

As shown in a user interface 940 illustrated in FIG. 9C, if a content file transfer completes, a "COMPLETED" status may be displayed in a status indicator 903c. Also, thread progress indicators 942a-942e may display a "COMPLETED" status. In implementations where the user interface 940 displays progress for multiple content file transfers, an indication of transfer completion may be shown as each content file transfer completes.

The client-side component may maintain chunks of content received prior to the user input to pause transfer of content and may store tracking data that tracks progress of content transfer and that enables content transfer to resume at a point at which the transfer of content was paused, such as in response to selection of the resume control 924 of FIG. 9B. In response to selection of the resume control 924, the client-side component may resume transfer of content by identifying additional chunks of content that have not been received by the client-side component based on the stored tracking data. The client-side component may send a request to the server-side component to resume transfer of the additional chunks of content, may receive the additional chunks of content from the server-side component over one or more threads, and may recombine the maintained chunks of content and the additional chunks of content into the content file.

Figure 10:
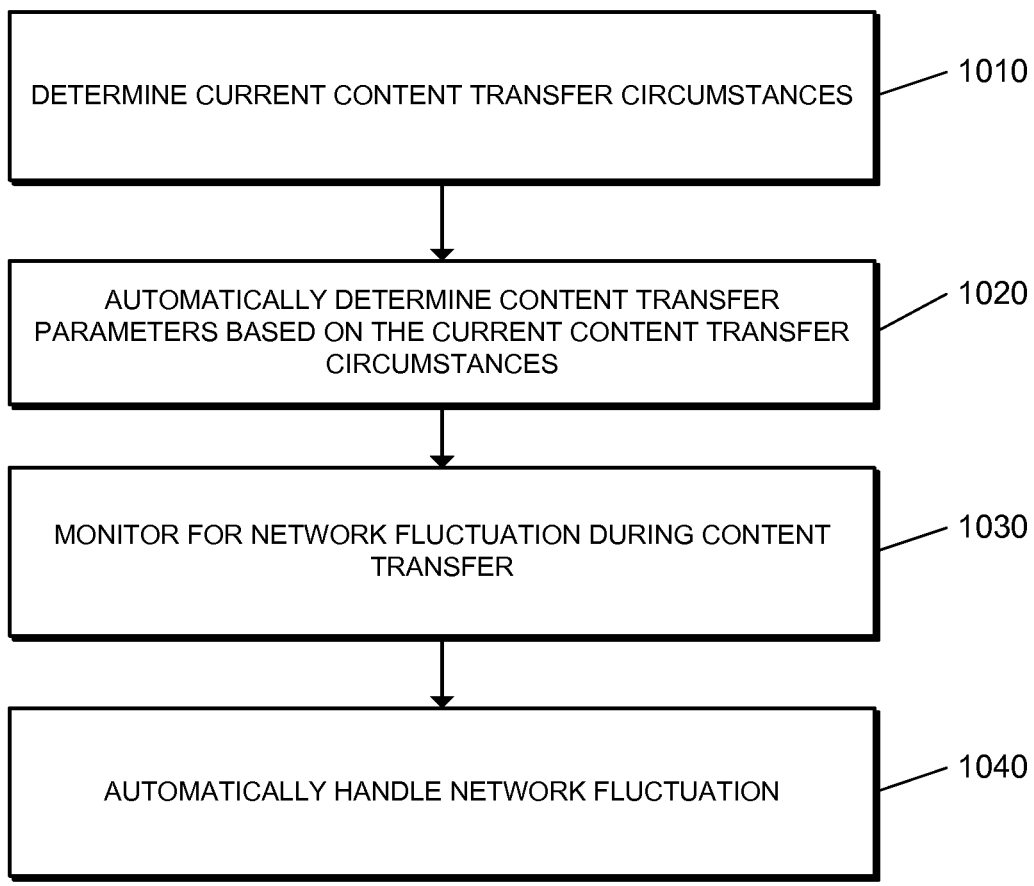

FIG. 10 illustrates a process 1000 for handling network fluctuation during content transfer. The operations of the process 1000 are described generally as being performed by the system 100. In some implementations, operations of the process 1000 may be performed by one or more processors included in one or more electronic devices.

The system 100 determines current content transfer circumstances (1010). For example, the system 100 may determine one or more characteristics relating to content speed, to the size of content currently being transferred, or to other characteristics. For example and as shown in a table 1100 illustrated in FIG. 11, a current download speed 1102 of thirty megabits per second and a content size 1104 of 3.4 gigabytes may be determined. Other examples include determining a recent (e.g., within the previous minute) maximum transfer rate or a recent minimum transfer rate. If multiple content transfers are occurring concurrently, content transfer circumstances may be determined for each content transfer, and one or more overall statistics (e.g., average download speed, total content size) may be determined for the multiple content transfers based on the content transfer circumstances determined for multiple, individual content transfers.

Figure 11:
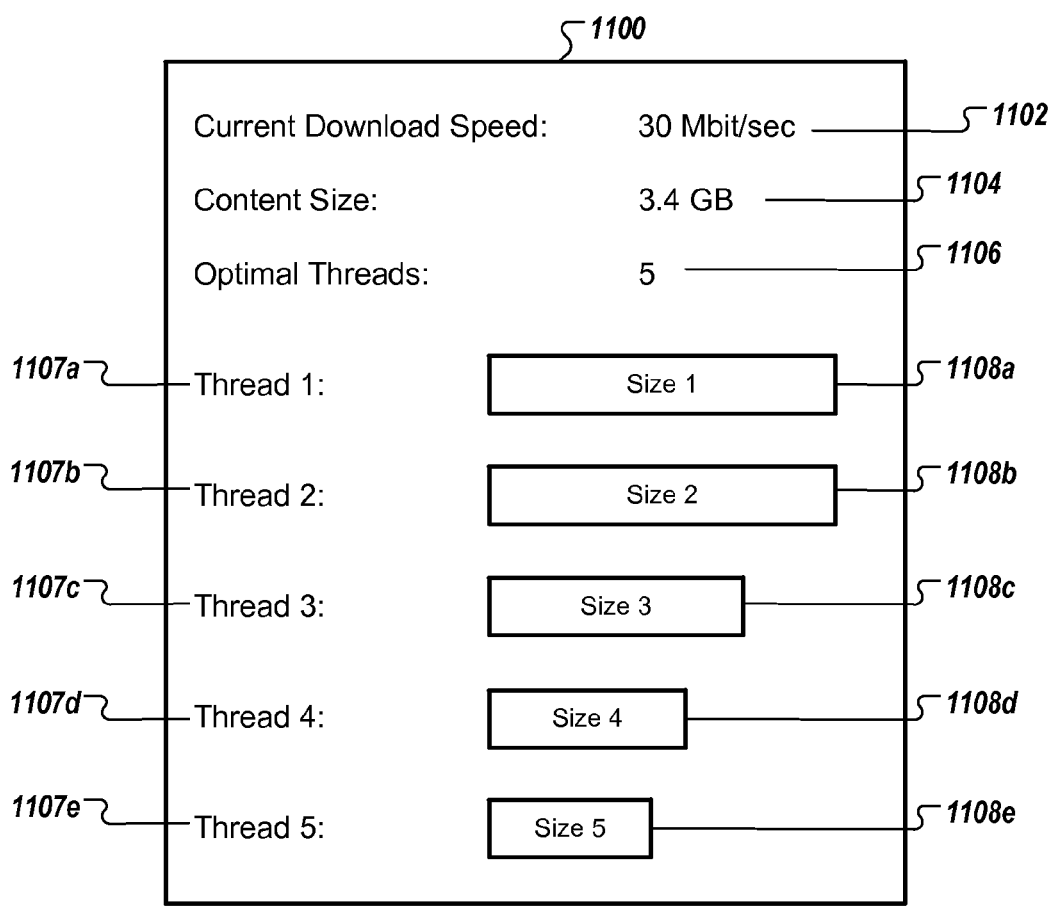
FIG. 11 is a diagram illustrating an exemplary table illustrating determination of content transfer parameters.
Like reference numbers represent corresponding parts throughout.

Returning to FIG. 10, the system 100 automatically determines content transfer parameters based on the current content transfer circumstances (1020). For example, the system 100 may determine a thread count to use for one or more content transfers. For instance, in the example of FIG. 11, a thread count of five 1106 has been determined for a content transfer. In the example of FIG. 11, five threads 1107a-1107e may be created based on the thread count 1106 of five. In addition, a chunk size may be determined for one or more threads based on the content size 1104 and/or based on the current download speed 1102. As shown in FIG. 11, the system 100 has automatically determined a chunk size for each of the five threads 1107a-1107e to attempt to optimize content transfer speed. In this example, the system 100 has assigned the largest size chunk size to threads one and two (e.g., Size One and Size Two are the same size chunk), and progressively smaller chunk sizes to threads three, four, and five (e.g., Size Two is greater than Size Three is greater than Size Four is greater than Size Five). In other examples, the system 100 may determine a single chunk size to be used in each of the threads.

In some implementations, the system 100 may determine a priority for one or more threads. For example, the system 100 may assign a same priority to each of multiple threads, or may assign a different priority to each thread. For instance, in the example of FIG. 11, priorities may be assigned to each thread 1107a-1107e, such as assigning a priority order of one to the thread 1107a, a priority order of two to the thread 1107b, a priority order of three to the thread 1107c, a priority order of four to the thread 1107d, and a priority order of five to the thread 1107e. In this instance, the system 100 assigns priority based on the size of the chunk to be transferred in each thread.

Returning to FIG. 10, the system 100 monitors for network fluctuation during content transfer (1030). For example, the system 100 may monitor current download speeds for one or more content transfers and may record whether a current download speed for a content transfer varies from a previous download speed for the content transfer by more than a threshold amount. For example, the system 100 may record that the difference between the current download speed for a content transfer and a previous download speed for the content transfer is more than 1 megabit per second difference. As another example, the system 100 may detect that a network outage has occurred.

As another example, the system 100 may monitor download progress of multiple threads. For instance, download progress for threads may be indicated by respective size indicators, where the size of each indicator indicates a respective download progress achieved by the respective thread. The system 100 may detect that one or more particular content transfers have stalled (e.g., have not had at least a minimum amount of progress for at least a predetermined amount of time).

Returning to FIG. 10, the system 100 automatically handles network fluctuation (1040). For example, in response to a determination that the current download speed for a content transfer is more than a threshold difference less than a previous download speed for the content transfer, the system 100 may allocate more resources to the content transfer, such as creating and assigning one or more new threads to the content transfer. As another example, the chunk size for one or more threads may be changed (e.g., made smaller) if a content transfer rate has decreased. As yet another example, one or more thread priorities may be reassigned. For example, referring to FIG. 11, priorities for the threads 1107a-1107e may be changed so that threads having lesser overall progress are given a higher priority than threads having a greater overall progress.

If a content transfer has been detected as being stalled, the system 100 may instruct one or more threads associated with the transfer to retry download requests multiple times up to a certain time limit or up to a certain number of download attempts. If a download has not successfully completed after a certain time limit or after a certain number of download attempts, the thread may send a notification (e.g., to an associated content transfer manager or to an associated job handler).

Figure 12:
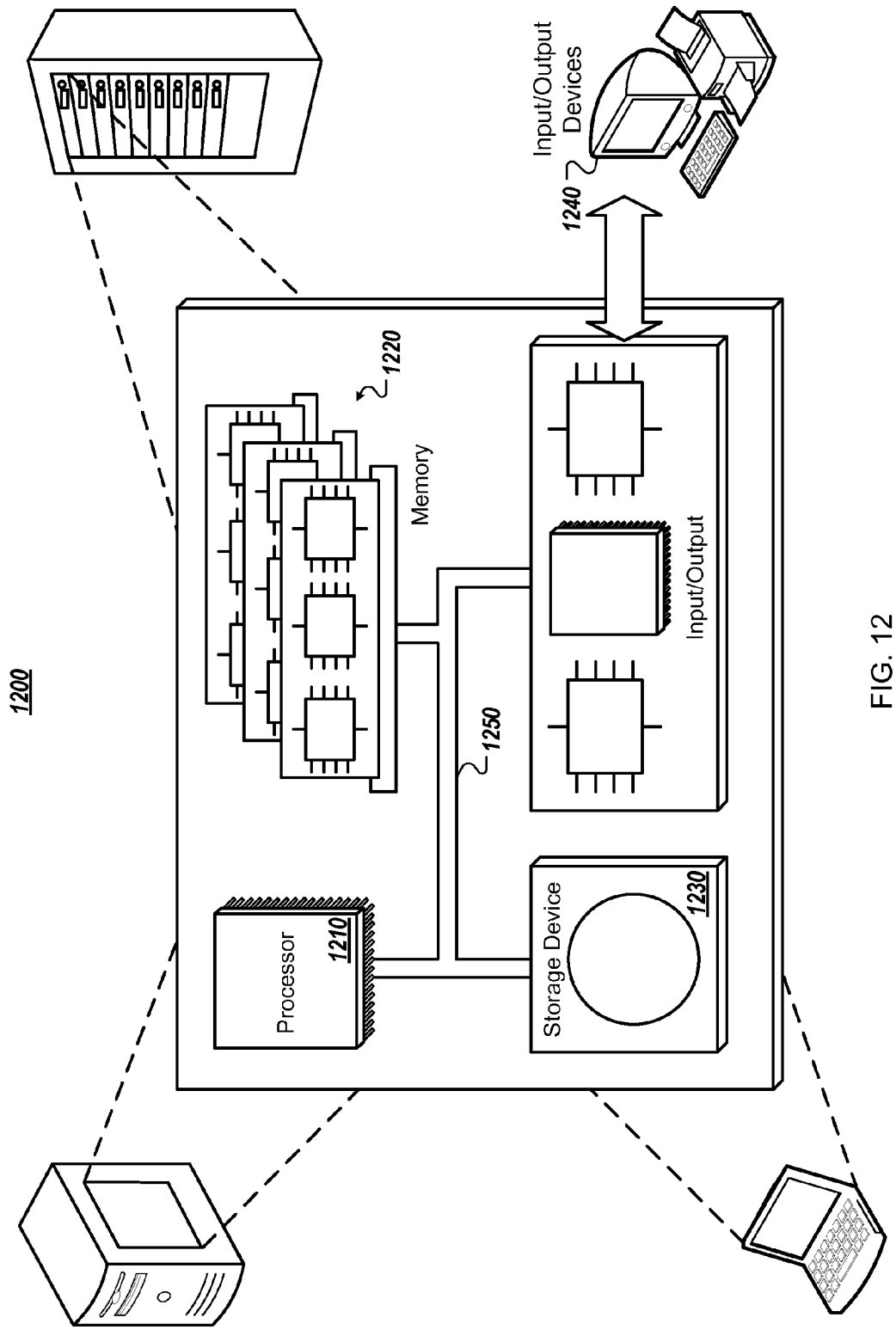

FIG. 12 is a schematic diagram of an example of a generic computer system 1200. The system 1200 can be used for the operations described in association with the processes 500, 700, and 1000, according to one implementation. For example, the system 1200 may be included in the client device 102, and the systems 104 and 200.

The system 1200 includes a processor 1210, a memory 1220, a storage device 1230, and an input/output device 1240. Each of the components 1210, 1220, 1230, and 1240 are interconnected using a system bus 1250. The processor 1210 is capable of processing instructions for execution within the system 1200. In one implementation, the processor 1210 is a single-threaded processor. In another implementation, the processor 1210 is a multi-threaded processor. The processor 1210 is capable of processing instructions stored in the memory 1220 or on the storage device 1230 to display graphical information for a user interface on the input/output device 1240.

The memory 1220 stores information within the system 1200. In one implementation, the memory 1220 is a computer-readable medium. In one implementation, the memory 1220 is a volatile memory unit. In another implementation, the memory 1220 is a non-volatile memory unit.

The storage device 1230 is capable of providing mass storage for the system 1200. In one implementation, the storage device 1230 is a computer-readable medium. In various different implementations, the storage device 1230 may be a floppy disk device, a hard disk device, an optical disk device, or a tape device.

The input/output device 1240 provides input/output operations for the system 1200. In one implementation, the input/output device 1240 includes a keyboard and/or pointing device. In another implementation, the input/output device 1240 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A system comprising:
 a client device that a) includes a client side component, and b) is located remote from a server that includes a server side component,
  the server side component configured to establish a connection with an enterprise content management system using a connector and that resides on an application server situated in a local area network with the enterprise content management system, and
  the client side component located remote from the server side component outside of the local area network and configured to communicate, over a wide area network, with the server side component to receive content managed by the enterprise content management system, wherein the client side component is configured to send, to the server side component, a request for a content file from the enterprise content management system, the request including an identifier for the content file and session information needed to establish a connection with the enterprise content management system;

wherein the server side component is configured to receive, from the client side component, the request for the content file, establish, using the connector and based on the session information, a connection with the enterprise content management system, and download, to the application server over the established connection, the content file based on the identifier for the content file;

wherein the client side component is configured to request the server side component to transfer, to the client side component, the content file in configurable size chunks over multiple threads, the client side component specifying a size of the chunks and a number of the multiple threads;

wherein the server side component is configured to read, from the content file downloaded to the application server, chunks of content of the size specified by the client side component and transfer, to the client side component, the chunks of content over the number of the multiple threads specified by the client side component;

wherein the client side component is configured to receive, from the server side component over the multiple threads, the chunks of content and, when all of the chunks of content have been received, recombine the chunks of content into the content file; and wherein the client side component is configured to, based on a determination of a change in a content transfer rate, pause transfer of content in a first subset of the multiple threads while not pausing transfer of content in a second subset of the multiple threads by:
sending, to the server side component, a request to stop transfer of additional chunks of content in the first subset of the multiple threads,
maintaining chunks of content received in the first subset of the multiple threads prior to sending the request to stop transfer of additional chunks of content in the first subset of the multiple threads, and
storing tracking data that tracks progress of content transfer in the first subset of the multiple threads and that enables content transfer in the first subset of the multiple threads to resume at a point at which the transfer of content in the first subset of the multiple threads was paused.

2. The system of claim 1, wherein the client side component is configured to, based on a determination of a change in a content transfer rate, resume transfer of content in the subset of the multiple threads by:
identifying additional chunks of content in the first subset of the multiple threads that have not been received by the client side component based on the stored tracking data,
sending, to the server side component, a request to resume transfer of the additional chunks of content in the first subset of the multiple threads,
receiving, from the server side component over the first subset of the multiple threads, the additional chunks of content, and
recombining the maintained chunks of content and the additional chunks of content into the content file.

3. The system of claim 2, wherein the client side component is configured to:
determine a current rate for transferring content to the client side component;
determine a previous rate for transferring content to the client side component;
compare the current rate for transferring content to the client side component with the previous rate for transferring content to the client side component; and
determine, in response to comparing the current rate for transferring content to the client side component with the previous rate for transferring content to the client side component, whether the current rate for transferring content to the client side component varies from the previous rate for transferring content to the client side component by more than a threshold amount, wherein the client side component is configured to pause transfer of content in a first subset of the multiple threads while not pausing transfer of content in a second subset of the multiple threads in response to determining that the current rate for transferring content to the client side component varies from the previous rate for transferring content to the client side component by more than a threshold amount.

4. The system of claim 1, wherein the client side component is configured to, based on a single user input command to pause transfer of the content file, pause transfer of content in all of the multiple threads by:
sending, to the server side component, a request to stop transfer of additional chunks of content in all of the multiple threads,
maintaining chunks of content received in all of the multiple threads prior to the user input to pause transfer of content, and
storing tracking data that tracks progress of content transfer in all of the multiple threads and that enables content transfer in all of the multiple threads to resume at a point at which the transfer of content in all of the multiple threads was paused.

5. The system of claim 4, wherein the client side component is configured to, based on a single user input command to resume transfer of the content file, resume transfer of content in all of the multiple threads by:
identifying additional chunks of content in all of the multiple threads that have not been received by the client side component based on the stored tracking data,
sending, to the server side component, a request to resume transfer of the additional chunks of content in all of the multiple threads,
receiving, from the server side component over the multiple threads, the additional chunks of content, and
recombining the maintained chunks of content and the additional chunks of content into the content file.

6. The system of claim 1:
wherein the client side component is configured to send, to the server side component, a request for multiple content files;
wherein the server side component is configured to receive, from the client side component, the request for the multiple content files and download, to the application server, the multiple content files;

wherein the client side component is configured to request the server side component to transfer, to the client side component, the multiple content files in configurable size chunks over multiple threads, the client side component specifying a size of the chunks and a number of the multiple threads;

wherein the server side component is configured to simultaneously transfer, to the client side component, the multiple content files by reading, from the multiple content files downloaded to the application server, chunks of content of the size specified by the client side component and transferring, to the client side component, the chunks of content over the number of the multiple threads specified by the client side component; and wherein the client side component is configured to receive, from the server side component over the multiple threads, the chunks of content and recombine the chunks of content into the multiple content files.

7. The system of claim 6, wherein the client side component is configured to assign, based on user input, priorities for transferring the multiple content files and control transfer of the multiple content files based on the assigned priorities.

8. The system of claim 6:

wherein the client side component is configured to send, to the server side component, a request for multiple content files from multiple, different enterprise content management systems, the request including an identifier for each of the multiple content files and session information needed to establish a connection with each of the multiple, different enterprise content management systems;

wherein the server side component is configured to receive, from the client side component, the request for the multiple content files, establish, using multiple connectors and based on the session information, connections with each of the multiple, different enterprise content management systems, and download, to the application server over the established connections, the multiple content files based on the identifiers, each of the multiple connectors being configured to interface and enable connection with a particular enterprise content management system;

wherein the client side component is configured to request the server side component to transfer, to the client side component, the multiple content files in configurable size chunks over multiple threads, the client side component specifying a size of the chunks and a number of the multiple threads;

wherein the server side component is configured to simultaneously transfer, to the client side component, the multiple content files from the multiple, different enterprise content management systems by reading, from the multiple content files downloaded to the application server, chunks of content of the size specified by the client side component and transferring, to the client side component, the chunks of content over the number of the multiple threads specified by the client side component; and wherein the client side component is configured to receive, from the server side component over the multiple threads, the chunks of content and recombine the chunks of content into the multiple content files.

9. The system of claim 1, wherein the client side component is configured to determine current content transfer circumstances associated with transferring the content file to the client side component and automatically, without user input, determine content transfer parameters to use in transferring the content file to the client side component based on the current content transfer circumstances.

10. The system of claim 9, wherein the client side component is configured to determine a size of the content file and automatically, without user input, determine the content transfer parameters to use in transferring the content file to the client side component based on the size of the content file.

11. The system of claim 9, wherein the client side component is configured to determine a current rate for transferring content to the client side component and automatically, without user input, determine the content transfer parameters to use in transferring the content file to the client side component based on the current rate for transferring content to the client side component.

12. The system of claim 9, wherein the client side component is configured to determine current content transfer circumstances associated with transferring the content file to the client side component and automatically, without user input, determine the size of the chunks to use in transferring the content file to the client side component based on the current content transfer circumstances.

13. The system of claim 9, wherein the client side component is configured to determine current content transfer circumstances associated with transferring the content file to the client side component and automatically, without user input, determine the number of the multiple threads to use in transferring the content file to the client side component based on the current content transfer circumstances.

14. The system of claim 9, wherein the client side component is configured to determine a size of the content file, determine a current rate for transferring content to the client side component, and automatically, without user input, determine the size of the chunks and the number of the multiple threads to use in transferring the content file to the client side component based on the size of the content file and the current rate for transferring content to the client side component.

15. The system of claim 1, wherein the client side component is configured to:

determine a current rate for transferring content to the client side component;

determine a previous rate for transferring content to the client side component;

compare the current rate for transferring content to the client side component with the previous rate for transferring content to the client side component;

determine, in response to comparing the current rate for transferring content to the client side component with the previous rate for transferring content to the client side component, whether the current rate for transferring content to the client side component varies from the previous rate for transferring content to the client side component by more than a threshold amount; and automatically, without user input, modify content transfer parameters to use in transferring the content file to the client side component in response to determining that the current rate for transferring content to the client side component varies from the previous rate for transferring content to the client side component by more than a threshold amount.

16. The system of claim 15, wherein the client side component is configured to automatically, without user input, restart transfer of the content file in response to determining that the current rate for transferring content to the client side component varies from the previous rate for transferring content to the client side component by more than a threshold amount.

17. The system of claim 1, wherein the server side component is configured to establish connections with multiple, different enterprise content management systems using multiple connectors, each of the multiple connectors being configured to interface and enable connection with a particular enterprise content management system.

18. A system comprising:
a client device that a) includes a client side component, and b) is located remote from a server that includes a server side component,
the server side component configured to establish connections with multiple, different enterprise content management systems using multiple connectors, each of the multiple connectors being configured to interface and enable connection with a particular enterprise content management system, at least one of the multiple connectors residing on an application server situated in a local area network with the enterprise content management system, wherein the multiple, different enterprise content management systems comprise at least a first enterprise content management system with which the server side component establishes a connection using a first connector and a second enterprise content management system with which the server side component establishes a connection using a second connector, and
the client side component located remote from the server side component outside of the local area network and configured to communicate, over a wide area network, with the server side component to receive content managed by the enterprise content management system,
wherein the client side component is configured to send, to the server side component, a request for a first content file from the first enterprise content management system and a second content file from the second enterprise content management system, the request including a first identifier for the first content file, a second identifier for the second content file, first session information needed to establish a connection with the first enterprise content management system, and second session information needed to establish a connection with the second enterprise content management system;
wherein the server side component is configured to receive, from the client side component, the request for the first content file and the second content file, establish, using the first connector and based on the first session information, a first connection with the first enterprise content management system, download, to the application server over the first connection, the first content file based on the first identifier for the first content file, establish, using the second connector and based on the second session information, a second connection with the second enterprise content management system, and download, to the application server over the second connection, the second content file based on the second identifier for the second content file;
wherein the client side component is configured to request the server side component to transfer, to the client side component, the first content file and the second content file each in configurable size chunks over multiple threads, the client side component specifying a size of the chunks and a number of the multiple threads;
wherein the server side component is configured to read, from the first content file and the second content file downloaded to the application server, chunks of content of the size specified by the client side component and transfer, to the client side component, the chunks of content over the number of the multiple threads specified by the client side component; and
wherein the client side component is configured to receive, from the server side component over the multiple threads, the chunks of content and, for each of the first content file and the second content file when all of the chunks of content for the particular content file have been received, recombine the chunks of content into the particular content file.

19. A computer-implemented method comprising:
sending, from a client side component to a server side component, a request for a content file from an enterprise content management system, the server side component being configured to establish a connection with the enterprise content management system using a connector and residing on an application server situated in a local area network with the enterprise content management system, the client side component being located remote from the server side component outside of the local area network and being configured to communicate, over a wide area network, with the server side component to receive content managed by the enterprise content management system, and the request including an identifier for the content file and session information needed to establish a connection with the enterprise content management system;
receiving, by the server side component from the client side component, the request for the content file;
establishing, by the server side component using the connector and based on the session information, a connection with the enterprise content management system;
downloading, by the server side component to the application server over the established connection, the content file based on the identifier for the content file;
requesting the server side component to transfer, to the client side component, the content file in configurable size chunks over multiple threads, the client side component specifying a size of the chunks and a number of the multiple threads;
reading, by the server side component from the content file downloaded to the application server, chunks of content of the size specified by the client side component;
transferring, by the server side component to the client side component, the chunks of content over the number of the multiple threads specified by the client side component;
pausing, based on a determination of a change in a content transfer rate, transfer of content in a first subset of the multiple threads while not pausing transfer of content in a second subset of the multiple threads by:
sending, to the server side component, a request to stop transfer of additional chunks of content in the first subset of the multiple threads,
maintaining chunks of content received in the first subset of the multiple threads prior to sending the request to stop transfer of additional chunks of content in the first subset of the multiple threads, and
storing tracking data that tracks progress of content transfer in the first subset of the multiple threads and that enables content transfer in the first subset of the multiple threads to resume at a point at which the transfer of content in the first subset of the multiple threads was paused;

receiving, by the client side component from the server side component over the multiple threads, the chunks of content; and when all of the chunks of content have been received, recombining, by the client side component, the chunks of content into the content file.

* * * * *